(12) United States Patent
Ross

(10) Patent No.: US 10,318,446 B2
(45) Date of Patent: Jun. 11, 2019

(54) AGGREGATION HANDLING

(71) Applicant: INTERNATIONAL BUSINESS MACHINES CORPORATION, Armonk, NY (US)

(72) Inventor: Martin A. Ross, Gosport (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 259 days.

(21) Appl. No.: 15/353,189

(22) Filed: Nov. 16, 2016

(65) Prior Publication Data

US 2018/0137066 A1    May 17, 2018

(51) Int. Cl.
*G06F 13/16* (2006.01)
*G06F 13/42* (2006.01)

(52) U.S. Cl.
CPC ........ *G06F 13/1642* (2013.01); *G06F 13/161* (2013.01); *G06F 13/4239* (2013.01); *G06F 13/4243* (2013.01)

(58) Field of Classification Search
CPC ............... G06F 13/161; G06F 13/1642; G06F 13/4239; G06F 13/4243
See application file for complete search history.

(56) References Cited

U.S. PATENT DOCUMENTS

| | | | |
|---|---|---|---|
| 7,912,895 B2 | 3/2011 | Khodabakchian | |
| 8,364,750 B2 | 1/2013 | Bolognese et al. | |
| 8,380,820 B1* | 2/2013 | Kumarjiguda | .... H04L 29/08099 709/219 |
| 8,805,938 B2 | 8/2014 | Yu | |
| 2003/0065709 A1* | 4/2003 | Jordan | .................. G06F 9/5027 709/202 |
| 2005/0125508 A1* | 6/2005 | Smith | ................. H04L 67/1008 709/220 |
| 2013/0262302 A1* | 10/2013 | Lettow | ................. G06Q 20/027 705/41 |

(Continued)

OTHER PUBLICATIONS

Norris, Rachel, "Aggregation design patterns and performance considerations in WebSphere Enterprise Service Bus V7.5", [retrieved on Aug. 2, 2016]. Retrieved from the Internet: <URL: http://www.ibm.com/developerworks/websphere/library/techarticles/1111_norris/1111_norris.html>, Nov. 6, 2011, 11 pgs.

(Continued)

*Primary Examiner* — Eric T Oberly
(74) *Attorney, Agent, or Firm* — Brian Restauro; Matthew M. Hulihan; Heslin Rothenberg Farley & Mesiti PC

(57) ABSTRACT

A method receives an inbound request to be processed based on multiple outbound service invocations of multiple outbound services. The method accesses expected response times for the inbound request for each of the multiple outbound services. The method determines which one or more of the multiple outbound services to invoke asynchronously and which one or more of the multiple outbound services to invoke synchronously based on the expected response times for the inbound request for each of the multiple outbound services. The method invokes asynchronously the one or more of the multiple outbound services determined to be invoked asynchronously, invokes synchronously the one or more of the multiple outbound services determined to be invoked synchronously.

15 Claims, 6 Drawing Sheets

(56) References Cited

U.S. PATENT DOCUMENTS

2017/0006141 A1* 1/2017 Bhadra .................. H04W 4/70

OTHER PUBLICATIONS

Ross, Martin, et al., "Parallel invocation of synchronous services in WebSphere Enterprise Service Bus", [retrieved on Aug. 2, 2016]. Retrieved from the Internet: <URL: http://www.ibm.com/developerworks/websphere/library/techarticles/1312_ross/1312_ross.html>, Dec. 18, 2013, 11 pgs.

Malkit-Oracle, "Invoking Synchronous Services Dynamically (In-Parallel) using BPEL (for Each Parallel)", [retrieved on Aug. 18, 2016]. Retrieved from the Internet: <URL: https://blogs.oracle.com/malkit/entry/dynamic_services_composition_in_bpel>, Jun. 6, 2008, 5 pgs.

Meier, J.D., et al., "Chapter 10—Improving Web Services Performance", Improving .NET Application Performance and Scalability. Retrieved from the Internet: <URL: https://msdn.microsoft.com/en-us/library/ff647786(d=printer).aspx>, May 2004, 25 pgs.

* cited by examiner

AGGREGATION HANDLING

BACKGROUND

Aggregation is an important enterprise service bus (ESB) pattern enabling a single inbound request to map into multiple outbound service invocations, the responses from which can be aggregated into a single reply to the original request, all of which may be handled by the ESB. In such design patterns, a common implementation may include invoking multiple synchronous services asynchronously, enabling concurrent processing of the separate invocations to reduce over response time of the solution. This typically involves utilizing a messaging layer to correlate requests and responses and provide a context switch to a separate component to hand the synchronous invocation while the original thread continues with additional concurrent processing.

In the simple case such implementations can help to reduce response times in the aggregation block (the ESB) from the sum of the service invocations (each invoked in turn), to the response time of the longest service invocation (each invoked concurrently). However, invoking a synchronous service asynchronously has additional overheads to invoking the same service synchronously, such as an additional messaging layer and context switch, which drives additional processing costs.

SUMMARY

Aspects described herein relate to facilities for handling an inbound request requiring multiple outbound service invocations, and specifically provide a more efficient solution in terms of resource utilization while maintaining the benefits of a reduced response time.

According to one aspect, there is provided a computer implemented method that includes receiving an inbound request to be processed based on multiple outbound service invocations of multiple outbound services. The method further includes accessing expected response times for the inbound request for each of the multiple outbound services. The method also includes determining which one or more of the multiple outbound services to invoke asynchronously and which one or more of the multiple outbound services to invoke synchronously based on the expected response times for the inbound request for each of the multiple outbound services. The method further includes invoking asynchronously the one or more of the multiple outbound services determined to be invoked asynchronously. The method also includes invoking synchronously the one or more of the multiple outbound services determined to be invoked synchronously.

According to another aspect, there is provided a computer system including a memory and a processor in communication with the memory. The computer system is configured to perform a method that includes receiving an inbound request to be processed based on multiple outbound service invocations of multiple outbound services. The method further includes accessing expected response times for the inbound request for each of the multiple outbound services. The method also includes determining which one or more of the multiple outbound services to invoke asynchronously and which one or more of the multiple outbound services to invoke synchronously based on the expected response times for the inbound request for each of the multiple outbound services. The method further includes invoking asynchronously the one or more of the multiple outbound services determined to be invoked asynchronously. The method also includes invoking synchronously the one or more of the multiple outbound services determined to be invoked synchronously.

According to yet another aspect, there is provided a computer program product for controlling a system. The computer program product includes a computer readable storage medium having program instructions embodied therewith. The program instructions are executable by a computer perform a method that includes receiving an inbound request to be processed based on multiple outbound service invocations of multiple outbound services. The method further includes accessing expected response times for the inbound request for each of the multiple outbound services. The method also includes determining which one or more of the multiple outbound services to invoke asynchronously and which one or more of the multiple outbound services to invoke synchronously based on the expected response times for the inbound request for each of the multiple outbound services. The method further includes invoking asynchronously the one or more of the multiple outbound services determined to be invoked asynchronously. The method also includes invoking synchronously the one or more of the multiple outbound services determined to be invoked synchronously.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
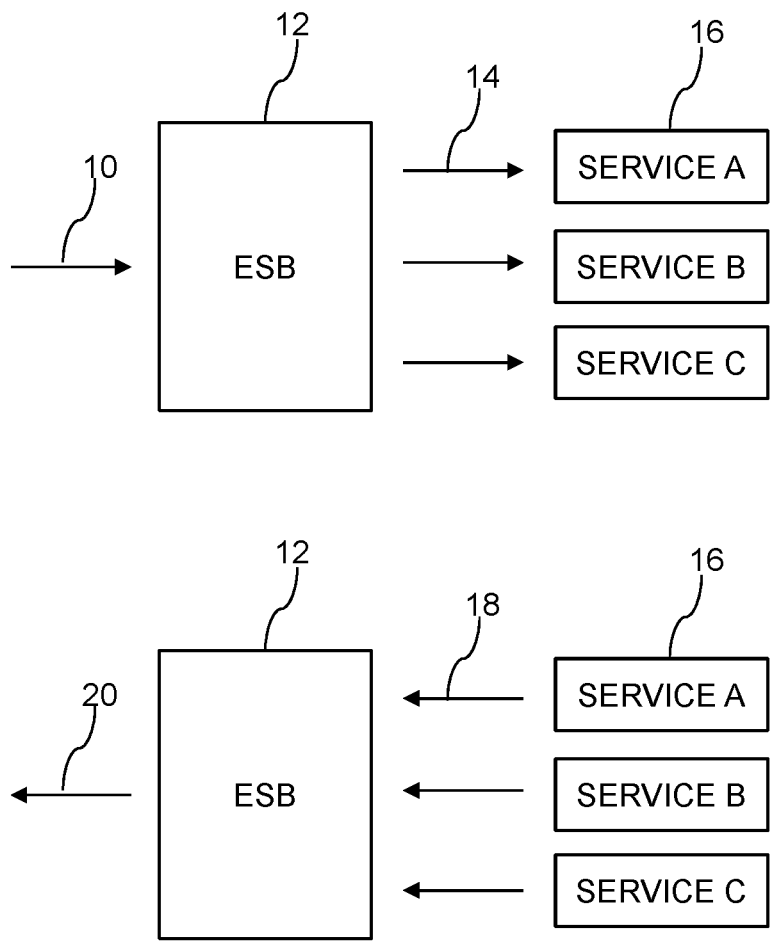
FIG. 1 is a schematic diagram of the handling an inbound request to be processed based on multiple outbound service invocations in accordance with aspects described herein.

FIG. 1 shows schematically an inbound request 10 being received by an enterprise service bus (ESB), the request 10 be processed based on multiple outbound service invocations 12. For instance, it may be desired, necessary, or required that the multiple outbound service invocations 14 be made in order to facilitate processing of request 10. The services 16 are the targets for the invocations 14 and the ESB 12 performs aggregation by receiving a single request 10, generating multiple outbound invocations 14, receiving responses 18 from the services 16 and then generating a single reply 20 to the originator of the request 10. The ESB 12 decides how the outbound invocations 14 are scheduled in terms of which invocations 14 are dealt with asynchronously and which invocations 14 are dealt with synchronously. The scheduling of the invocations 14 is designed to balance speed and efficiency.

As noted above, aggregation is an important enterprise service bus (ESB) pattern. Aggregation enables the single inbound request 10 to map into the multiple outbound service invocations 14, the responses 18 from which can be aggregated into a single reply 20 to the original request 10, all of which is handled by the ESB 12. In such design patterns a common implementation may include invoking multiple synchronous services asynchronously, enabling concurrent processing of the separate invocations 14 to reduce over response time of the solution. This typically involves utilizing a messaging layer to correlate requests and responses and provide a context switch to a separate component to hand the synchronous invocation while the original thread continues with additional concurrent processing.

In the simple case, such implementations can help to reduce response times in the aggregation block (the ESB 12) from the sum of the service invocations 14 (each invoked in turn), to the response time of the longest service invocation 14 (each invoked concurrently). However, invoking a synchronous service 16 asynchronously has additional overheads to invoking the same service 16 synchronously, such as an additional messaging layer and context switch, which drives additional processing costs. A solution is needed to provide a more efficient solution in terms of resource utilization while maintaining the benefits of a reduced response time. This is achieved by the scheduling carried out by the ESB 12 as described herein.

The ESB 12 uses an alternative processing option that tracks response/processing times of each leg of an aggregation block and correlates this with the properties of the message being processed, such as message size, structure, fields, headers and so on. The integration solution could start by invoking each service 16 asynchronously (in parallel), then make a determination of whether to invoke each of the synchronous services 16 synchronously or asynchronously based on the message properties, historical data of processing times and application requirements, as examples, once a corpus of data had been collected to make appropriate determinations.

The ESB 12 captures data in relation to the operation of invocations 14 in respect of individual services 16 to build up a database of expected response times for different types of invocations 14 for the different services 16. For example, an invocation 14 may be a read request for a specific set of data hosted by a service 16. Expected response times can be built up for such read requests for that service 16, based upon the nature of the read request, such as the size of the data being requested and the field(s) in the invocation 14 that relate to the location of the data to be read within the service 16.

Figure 2:
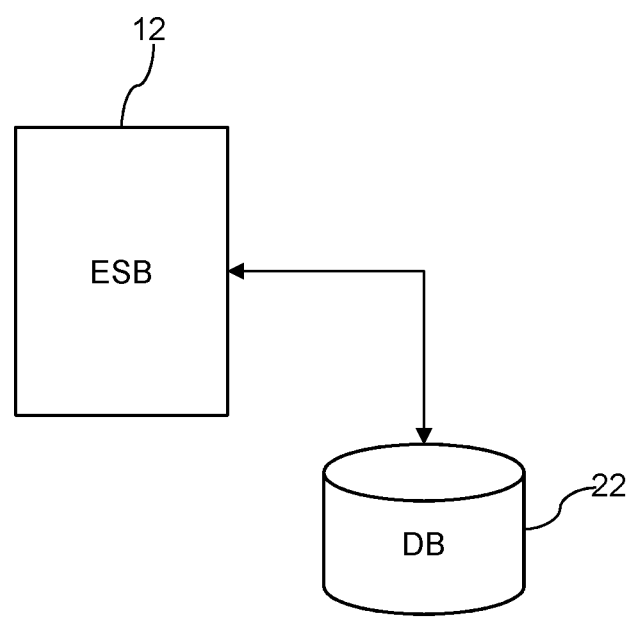
FIG. 2 is a schematic diagram of an enterprise service bus connected to a database in accordance with aspects described herein.

FIG. 2 shows the ESB 12 connected to and in data communication with a database 22, which is populated with performance data in relation to or indicating the response times of the different services 16. As the ESB invokes the different services 16, then response times are captured and this data is stored in the database 22. The entries within the database may be stored on a per-service basis and characteristics such as message size and so on may be used to categorize the different response times recorded. This allows the ESB 12 to build up the database 22 that can be used to predict an expected response time for a specific service 16 for a new request 10, given similarity or correlation to the data stored within the database 22.

An illustration of how the ESB 12 operates is shown below by means of an example with reference to FIG. 3. An aggregation block is configured to take a single inbound message 10 and invoke five (in this example) synchronous services 16 (e.g. services with an HTTP interface) asynchronously to improve response times. As discussed above, the ESB 12 is configured to track response/processing times for each leg of the aggregation block and store this associated with the message properties. A subsequent message may then be processed with message properties (i.e. message size) similar to messages seen previously. The ESB 12, when accessing expected response times for the inbound request 10 for each of the outbound services 16 to be invoked for processing the request, determines one or more properties of the inbound request 10 and accesses stored expected response times for respective outbound services 16 for each determined property of the inbound request 10. There may be overlap in the respective outbound services involved, in that the responses times of a common one or more outbound service s may be accessed for two or more of the determined properties of the outbound request.

Figure 3:
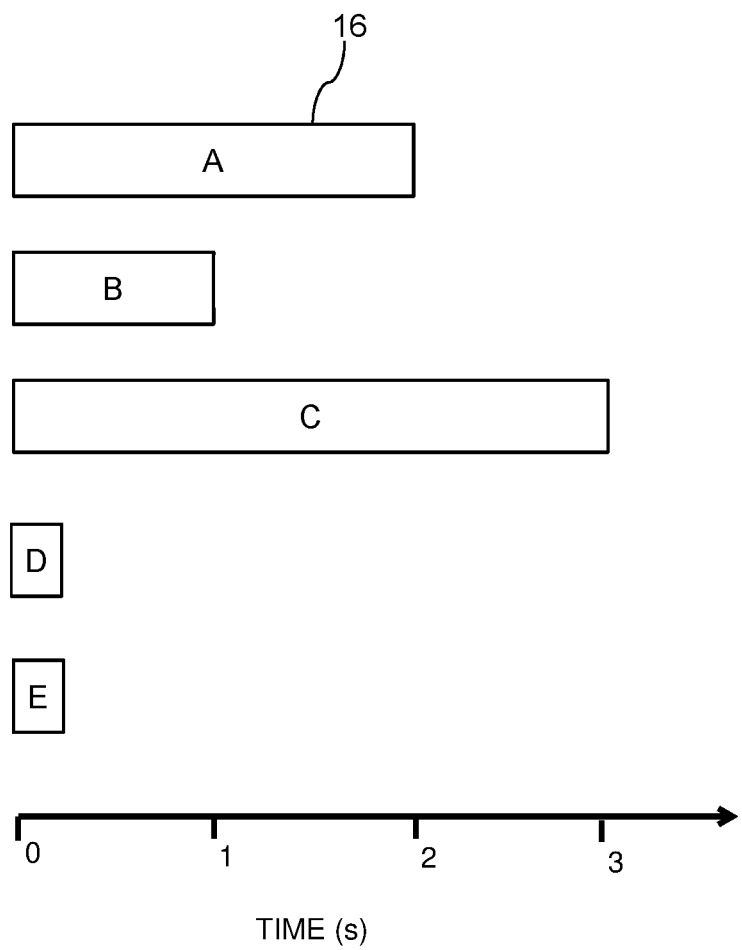
FIG. 3 is a schematic diagram of expected response times for services to respond to an invocation in accordance with aspects described herein.

The ESB 12 queries the historic tracking data stored in the database 22 to retrieve estimates for processing times for each branch of the aggregation block, and in the example of FIG. 3, the following expected response times are generated for the five involved services (correlating to the five branches): Branch A=2 seconds, branch B=1 second, branch C=3 seconds, branch D=0.2 seconds and branch E=0.2 seconds, as shown in FIG. 3. Based on this data, the ESB 12 may make a determination about which order to process each of the branches and for each of the services 16 whether to invoke them synchronously or asynchronously.

The ESB 12 first processes branch C asynchronously, as this is the service 16 with the longest expected response time. The ESB 12 then processes branch A asynchronously, as this is the branch with the second longest expected response time, but this may or may not be performed synchronously with the remaining branches and still return before branch C is expected to return. The ESB may then process branches B, D and E in turn synchronously, since the sum of expected response times is 1+0.2+0.2=1.4 seconds. So, the ESB 12 may expect to complete branches B, D and E all prior to branches A or C completing. Each branch completes in (or about) the expected time and as branches B, D and E were invoked synchronously, it may take 1.4 seconds to complete these. As noted, they may still return before branches A and C were completed. However, as branches B, D, E were invoked synchronously, the messaging overhead would not be incurred and thus the message processing would use fewer CPU cycles (and other resources) than invoking each asynchronously.

The ESB 12 operating in this manner provides improved response times for aggregation scenarios and reduced CPU cycles for aggregation scenarios. The ESB 12 delivers the managing and modifying of invocation styles of service invocations for aggregation design patterns with improved process time and reduced CPU cycles. The ESB operates by basing the dynamic modifications on observed message properties and response times for synchronous invocations within branches of the aggregation solution. Previous harvesting of response times for individual services 16 leads to the building up of data in the database 22 that can be used to predict response times for future requests that result in invocations of those services 16.

Figure 4:
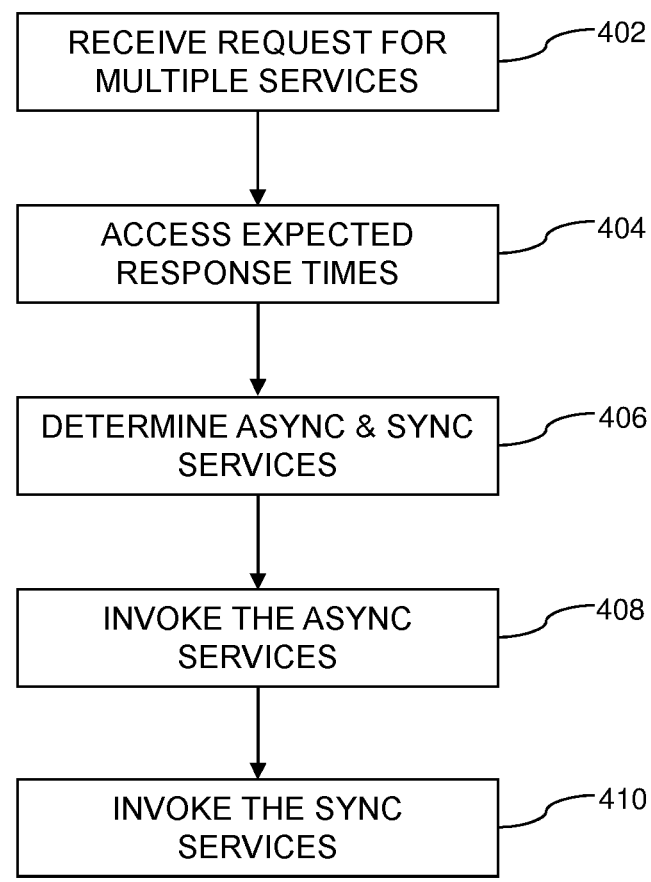
FIG. 4 is a flowchart of a method of handling an inbound request to be processed based on multiple outbound service invocations in accordance with aspects described herein.

An embodiment of example operation of the ESB 12 is summarized in the flowchart of FIG. 4. The method includes receiving an inbound request (10) for multiple services (402), e.g. to be processed based on multiple outbound service invocations 14. The method continues by accessing expected response times (404) for the inbound request 10 for each of the outbound services 16. The ESB 12 receives the request 10 and examines the properties of the request 10 in order to access expected response times for the different service 16 that are to be invoked in order to respond to the request 10. The database 22 stores the necessary information that allows the ESB 12 to estimate the expected response times.

The method continues by determining which service(s) 16 to invoke asynchronously and which service(s) 16 to invoke synchronously (406) based on the expected response times for the inbound request 10 for each of the outbound services 16. The method continues by invoking asynchronously (408) those service(s) 16 determined to be invoked asynchronously, and invoking synchronously (410) those service(s) 16 determined to be invoked synchronously. In this way, the outbound invocations 14 are scheduled by the ESB 12 to balance the competing demands of speed and CPU requirements. One or more of the invocations 14 are processed asynchronously and the remaining invocations 14 are processed synchronously.

Figure 5:
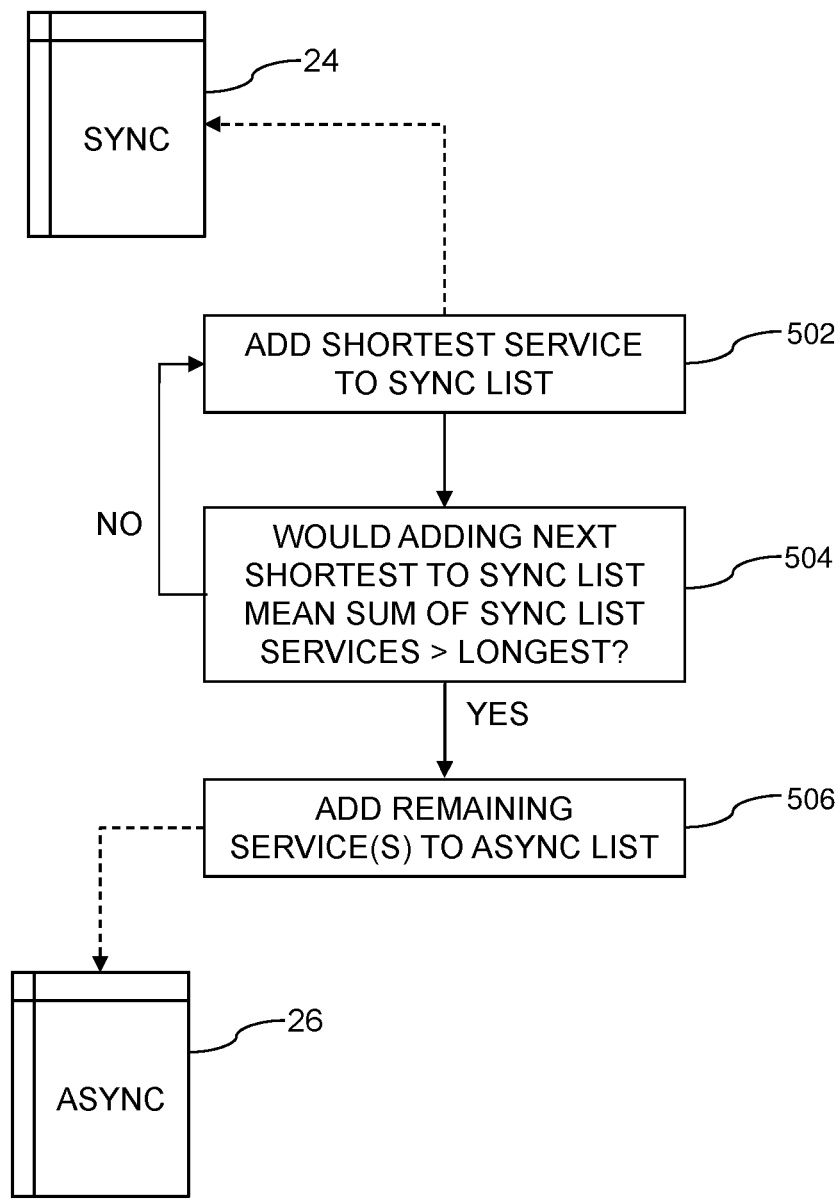
FIG. 5 is a flowchart of a method of determining whether outbound service invocations should be asynchronous or synchronous in accordance with aspects described herein.

FIG. 5 is a flowchart summarizing an embodiment of the decision making process used to determine the split between asynchronous and synchronous invocations 14. The ESB 12 maintains two lists, a "sync list" 24 and an "async list" 26, to which will be added the different services 16, in relation to the current request 10 that has been received by the ESB 12. The different branches of the outgoing invocations 14 are located on one list or the other list of the two lists 24 or 26 before the process can terminate and invoke the services 16. The process defined in the flowchart of FIG. 5 is designed to split the services 16 into those that will be invoked asynchronously and those that will be invoked synchronously.

The method of FIG. 5 includes adding the outbound service 16 with the shortest expected response time to the list 24 of service(s) 16 to be invoked synchronously (502). At 504 it is determined whether the sum of the expected response times for the service(s) 16 to be invoked synchronously would exceed the longest expected response time for any of the outbound services 16 if the next shortest service were added to the sync list 24. If this is not the case (504, No), then the method returns to 502 and the outbound service 16 with the next shortest expected response time is added to the list 24 of service(s) 16 to be invoked synchronously. This is repeated until the check at 504 is passed.

The method then proceeds by adding all outbound service(s) 16 not on the list 24 of service(s) 16 determined to be invoked synchronously to the list 26 of service(s) 16 determined to be invoked asynchronously (506). This means that once sufficient services 16 have been added to the list 24 of those services 16 to be invoked synchronously to generate a total expected response time that is longer than the service 16 with the longest expected response time then the other remaining services 16 will be added to the list 26 and will be invoked asynchronously. The ESB 12 builds up these lists 24 and 26, splitting the different services 16 that need to be invoked between the two different lists 24 and 26.

For example, if the expected response times of five different services 16 to be invoked are A=2, B=2, C=3, D=7 and E=8, then the methodology of FIG. 5 would first place the service A with lowest value (2) onto the synchronous list 24 and then check if the addition of the next shortest service (B=2) to the sum of the times of the services on the list 24 would be greater than the longest time for any service. Since at this point only service A is on the synchronous list and the total of A+B=4 which is less than E=8, then the method would return to 502 and continue by adding service B (the next lowest value) onto the synchronous list 24.

The total of the expected response times on the synchronous list is now 4 (service A=2+service B=2), and when checked at 504 as to whether adding the next shortest service (C=3) is still less than the expected response time for the service E=8 so the service 16 with the next smallest response time is added to the synchronous list which would be service C. The total of the expected response times on the synchronous list is now 7 (service A=2+service B=2+service C=3), which when checked at 504, the addition of the next shortest service (D=7) would be now greater than the longest expected response time for the service E, so the ESB 12 will now add all remaining services (D and E) to the asynchronous list 26 and the scheduling will terminate.

In this example, the result of the partitioning of the services 16 into a synchronous list 24 and an asynchronous list 26 means that there are effectively three parallel processing divisions of the services 16 that are to be invoked. These three divisions are: (i) service D, (ii) service E, and (iii) services A, B and C. The total time taken to invoke the services may be the time for services on the synchronous list 24 of services: A, B and C, which have a total expected response time of 7. The asynchronous services D and E may both be completed in parallel with this time period, with the service E=8 defining the longest expected time period.

The structure of the process shown in FIG. 5 is such that the method terminates before the total of those services 16 on the synchronous list 24 exceeds the longest service 16. However, different embodiments of this process are possible. For example, the process could be structured to continue adding services 16 to the synchronous list 24 until the sum of all of the services 16 on the synchronous list 24 exceeds the longest service 16. In this case, in the example above, the service D would have been added to the sync list 24 before only service E is considered to be invoked asynchronously. A percentage threshold could also be used as an extension of this embodiment, with a final service 16 being added to the synchronous list 24 if the total time of the synchronous list 24 is less than the longest service 16 plus an additional percentage (10% or 20% for example, specifiable by an administrator). This may result in a final service 16 being added to the synchronous list 24 only if the total time of the services 16 on the synchronous list 24 is not pushed too far in advance of the time of the longest service 16.

Figure 6:
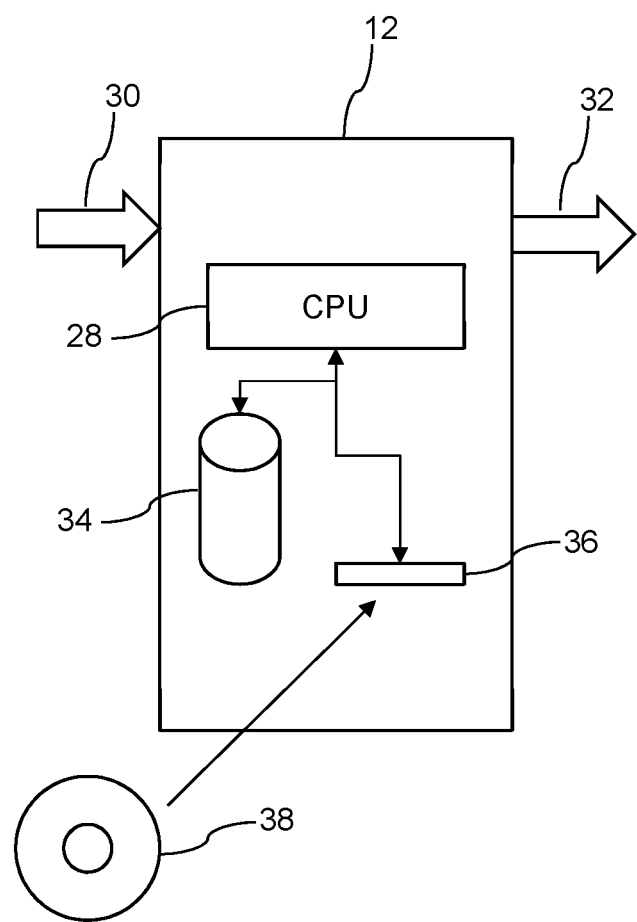
FIG. 6 is a schematic diagram of a computer processing system in accordance with aspects described herein.

FIG. 6 shows more detail of the ESB 12. The ESB 12 may be implemented as a computer system, such as one including a processor 28 that is connected to or incorporates an input connection 30 (which receives the requests 10) and an output connection 32 (which is connected to the services 16). The processor 28 of the ESB 12 may also connected to a local storage device 34 (which stores the database 22) and to a local interface 36. A computer readable storage medium 38 may be provided, which may be a storage medium, such as a CD-ROM, storing a computer program product that includes instructions that may execute to control the processor 28 to operate the ESB 12 in a manner according to aspects described herein. The processor 28 executes instructions from the computer program product to operate ESB 12.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiments were chosen and described in order to best explain various aspects and the practical application, and to enable others of ordinary skill in the art to understand various embodiments with various modifications as are suited to the particular use contemplated.

What is claimed is:

1. A computer implemented method comprising:
receiving an inbound request to be processed based on multiple outbound service invocations of multiple outbound services;
accessing expected response times for the inbound request for each of the multiple outbound services;
determining which one or more of the multiple outbound services to invoke asynchronously and which one or more of the multiple outbound services to invoke synchronously based on the expected response times for the inbound request for each of the multiple outbound services, wherein the determining which one or more of the multiple outbound services to invoke asynchronously and which one or more of the multiple outbound services to invoke synchronously based on the expected response times for the inbound request for each of the multiple outbound services comprises adding an outbound service, of the multiple outbound services, with the shortest expected response time to a list of one or more services determined to be invoked synchronously and iteratively adding one or more further outbound services, of the multiple outbound services, with a next shortest expected response time to the list of one or more services determined to be invoked synchronously, the iteratively adding being performed as long as a sum of expected response times for the one or more services determined to be invoked synchronously does not exceed a threshold;
invoking asynchronously the one or more of the multiple outbound services determined to be invoked asynchronously; and
invoking synchronously the one or more of the multiple outbound services determined to be invoked synchronously.

2. The method of claim 1, wherein the threshold comprises a longest expected response time for any of the multiple outbound services.

3. The method according to claim 1, wherein the determining which one or more of the multiple outbound services to invoke asynchronously and which one or more of the multiple outbound services to invoke synchronously based on the expected response times for the inbound request for each of the multiple outbound services further comprises adding all outbound services, of the multiple outbound services, not on the list of one or more services determined to be invoked synchronously to a list of one or more services, of the multiple outbound services, determined to be invoked asynchronously.

4. The method according to claim 1, further comprising monitoring response times of outbound service invocations and accordingly updating stored expected response times for at least one outbound service of the multiple outbound services.

5. The method according to claim 1, wherein the accessing expected response times for the inbound request for each of the multiple outbound services comprises determining one or more properties of the inbound request and accessing, for each determined property of the one or more properties of the inbound request, at least one stored expected response time for at least one outbound service of the multiple outbound services.

6. A computer system comprising:
a memory; and
a processor in communication with the memory, wherein the computer system is configured to perform a method comprising:
receiving an inbound request to be processed based on multiple outbound service invocations of multiple outbound services;
accessing expected response times for the inbound request for each of the multiple outbound services;
determining which one or more of the multiple outbound services to invoke asynchronously and which one or more of the multiple outbound services to invoke synchronously based on the expected response times for the inbound request for each of the multiple outbound services, wherein the determining which one or more of the multiple outbound services to invoke asynchronously and which one or more of the multiple outbound services to invoke synchronously based on the expected response times for the inbound request for each of the multiple outbound services comprises adding an outbound service, of the multiple outbound services, with the shortest expected response time to a list of one or more services determined to be invoked synchronously and iteratively adding one or more further outbound services, of the multiple outbound services, with a next shortest expected response time to the list of one or more services determined to be invoked synchronously, the iteratively adding being performed as long as a sum of expected response times for the one or more services determined to be invoked synchronously does not exceed a threshold;
invoking asynchronously the one or more of the multiple outbound services determined to be invoked asynchronously; and
invoking synchronously the one or more of the multiple outbound services determined to be invoked synchronously.

7. The system according to claim 6, wherein the threshold comprises a longest expected response time for any of the multiple outbound services.

8. The system according to claim 6, wherein the determining which one or more of the multiple outbound services to invoke asynchronously and which one or more of the multiple outbound services to invoke synchronously based on the expected response times for the inbound request for each of the multiple outbound services further comprises adding all outbound services, of the multiple outbound services, not on the list of one or more services determined to be invoked synchronously to a list of one or more services, of the multiple outbound services, determined to be invoked asynchronously.

9. The system according to claim 6, wherein the method further comprises monitoring response times of outbound service invocations and accordingly updating stored expected response times for at least one outbound service of the multiple outbound services.

10. The system according to claim 6, wherein the accessing expected response times for the inbound request for each of the multiple outbound services comprises determining one or more properties of the inbound request and accessing, for each determined property of the one or more properties of the inbound request, at least one stored expected response time for at least one outbound service of the multiple outbound services.

11. A computer program product comprising:
a computer readable storage medium having program instructions embodied therewith, the program instructions executable by a computer to perform a method comprising:
receiving an inbound request to be processed based on multiple outbound service invocations of multiple outbound services;
accessing expected response times for the inbound request for each of the multiple outbound services;
determining which one or more of the multiple outbound services to invoke asynchronously and which one or more of the multiple outbound services to invoke synchronously based on the expected response times for the inbound request for each of the multiple outbound services, wherein the determining which one or more of the multiple outbound services to invoke asynchronously and which one or more of the multiple outbound services to invoke synchronously based on the expected response times for the inbound request for each of the multiple outbound services comprises adding an outbound service, of the multiple outbound services, with the shortest expected response time to a list of one or more services determined to be invoked synchronously and iteratively adding one or more further outbound services, of the multiple outbound services, with a next shortest expected response time to the list of one or more services determined to be invoked synchronously, the iteratively adding being performed as long as a sum of expected response times for the one or more services determined to be invoked synchronously does not exceed a threshold;
invoking asynchronously the one or more of the multiple outbound services determined to be invoked asynchronously; and
invoking synchronously the one or more of the multiple outbound services determined to be invoked synchronously.

12. The computer program product according to claim 11, wherein the threshold comprises a longest expected response time for any of the multiple outbound services.

13. The computer program product according to claim 11, wherein the determining which one or more of the multiple outbound services to invoke asynchronously and which one or more of the multiple outbound services to invoke synchronously based on the expected response times for the inbound request for each of the multiple outbound services further comprises adding all outbound services, of the multiple outbound services, not on the list of one or more services determined to be invoked synchronously to a list of one or more services, of the multiple outbound services, determined to be invoked asynchronously.

14. The computer program product according to claim 11, wherein the method further comprises monitoring response times of outbound service invocations and accordingly updating stored expected response times for at least one outbound service of the multiple outbound services.

15. The computer program product according to claim 11, wherein the accessing expected response times for the inbound request for each of the multiple outbound services comprises determining one or more properties of the inbound request and accessing, for each determined property of the one or more properties of the inbound request, at least one stored expected response time for at least one outbound service of the multiple outbound services.

* * * * *